US012705854B2

(12) United States Patent
Nicholson et al.

(10) Patent No.: US 12,705,854 B2
(45) Date of Patent: Aug. 11, 2026

(54) IMAGE REGION OF INTEREST IDENTIFICATION

(71) Applicant: Lenovo (Singapore) Pte. Ltd., Singapore (SG)

(72) Inventors: John W. Nicholson, Cary, NC (US); Daryl C. Cromer, Raleigh, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 232 days.

(21) Appl. No.: 18/544,226

(22) Filed: Dec. 18, 2023

(65) Prior Publication Data

US 2025/0200926 A1 Jun. 19, 2025

(51) Int. Cl.
*G06V 10/25* (2022.01)
*G06V 10/141* (2022.01)

(52) U.S. Cl.
CPC ............ *G06V 10/25* (2022.01); *G06V 10/141* (2022.01); *G06V 2201/07* (2022.01)

(58) Field of Classification Search
CPC ... G06V 10/25; G06V 10/141; G06V 2201/07
See application file for complete search history.

(56) References Cited

U.S. PATENT DOCUMENTS

2007/0063048 A1* 3/2007 Havens ............. G06K 7/10702 235/462.46
2007/0080280 A1* 4/2007 Havens ............. G06K 7/10702 250/201.1
2008/0144186 A1* 6/2008 Feng ...................... G02B 7/028 359/666
2013/0322524 A1* 12/2013 Jang ..................... H04N 19/167 375/240.03
2017/0332060 A1* 11/2017 Chan ...................... H04N 9/646
2019/0043201 A1* 2/2019 Strong ................... G06V 10/96
2020/0159961 A1* 5/2020 Smith ..................... G06F 21/44
2021/0192692 A1* 6/2021 Takatsuka .............. H04N 23/60
2022/0109788 A1* 4/2022 Geissler ............... H04N 23/661
2023/0409271 A1* 12/2023 Agrawal ............. G06F 3/04845

FOREIGN PATENT DOCUMENTS

AU 2011352094 A1 * 7/2013 ......... G06F 16/7837
CA 2355757 C * 11/2007 ............. G01B 11/04
CA 2890328 A1 * 5/2014 ............. G05B 15/02

OTHER PUBLICATIONS

European Patent Office, European Search Report and Written Opinion, Apr. 14, 2025, 7 pages, Munich, Germany.

* cited by examiner

*Primary Examiner* — Qun Shen
(74) *Attorney, Agent, or Firm* — FERENCE & ASSOCIATES LLC

(57) ABSTRACT

One embodiment provides a method, the method including: receiving, from a first processor in communication with an image capture device of an image adjustment system and at a second processor, a frame including a scene; identifying, using the second processor, a region of interest within the frame; providing, from the second processor to the first processor, feedback identifying the region of interest; and adjusting, using the first processor and in view of characteristics of the region of interest, a parameter of the image capture device for subsequent frames captured by the image capture device. Other aspects are claimed and described.

18 Claims, 3 Drawing Sheets

IMAGE REGION OF INTEREST IDENTIFICATION

BACKGROUND

Utilizing video conferencing or call systems has become more commonplace, particularly in business settings, but also in personal settings. The ability to not only communicate with someone in a different physical location, but also see that person while communicating with them is desirable for many reasons. Video conferencing allows video participants to see body language which makes some people feel more connected with the video participants. Additionally, video conferencing allows video participants to see presentation materials, items which may be within a particular physical space, and/or other visual items which can result in video participants having a better understanding of discussion items. Video conferencing or video calls can also be used in personal settings and allows video call participants to see each other. Thus, video conferencing or calls is used quite frequently, and, in some cases may be the default communication mechanism for many users.

BRIEF SUMMARY

In summary, one aspect provides a method, the method including: receiving, from a first processor in communication with an image capture device of an image adjustment system and at a second processor, a frame including a scene; identifying, using the second processor, a region of interest within the frame; providing, from the second processor to the first processor, feedback identifying the region of interest; and adjusting, using the first processor and in view of characteristics of the region of interest, a parameter of the image capture device for subsequent frames captured by the image capture device.

Another aspect provides a system, the system including: an image capture device; a first processor in communication with the image capture device; a second processor in communication with the first processor; a memory device that stores instructions that, when executed by the processor, causes the system to: receive, from the first processor of an image adjustment system and at the second processor, a frame including a scene; identify, using the second processor, a region of interest within the frame; provide, from the second processor to the first processor, feedback identifying the region of interest; and adjust, using the first processor and in view of characteristics of the region of interest, a parameter of the image capture device for subsequent frames captured by the image capture device.

A further aspect provides a product, the product including: a computer-readable storage device that stores executable code that, when executed by a processor, causes the product to: receive, from a first processor in communication with an image capture device of an image adjustment system and at a second processor, a frame including a scene; identify, using the second processor, a region of interest within the frame; provide, from the second processor to the first processor, feedback identifying the region of interest; and adjust, using the first processor and in view of characteristics of the region of interest, a parameter of the image capture device for subsequent frames captured by the image capture device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
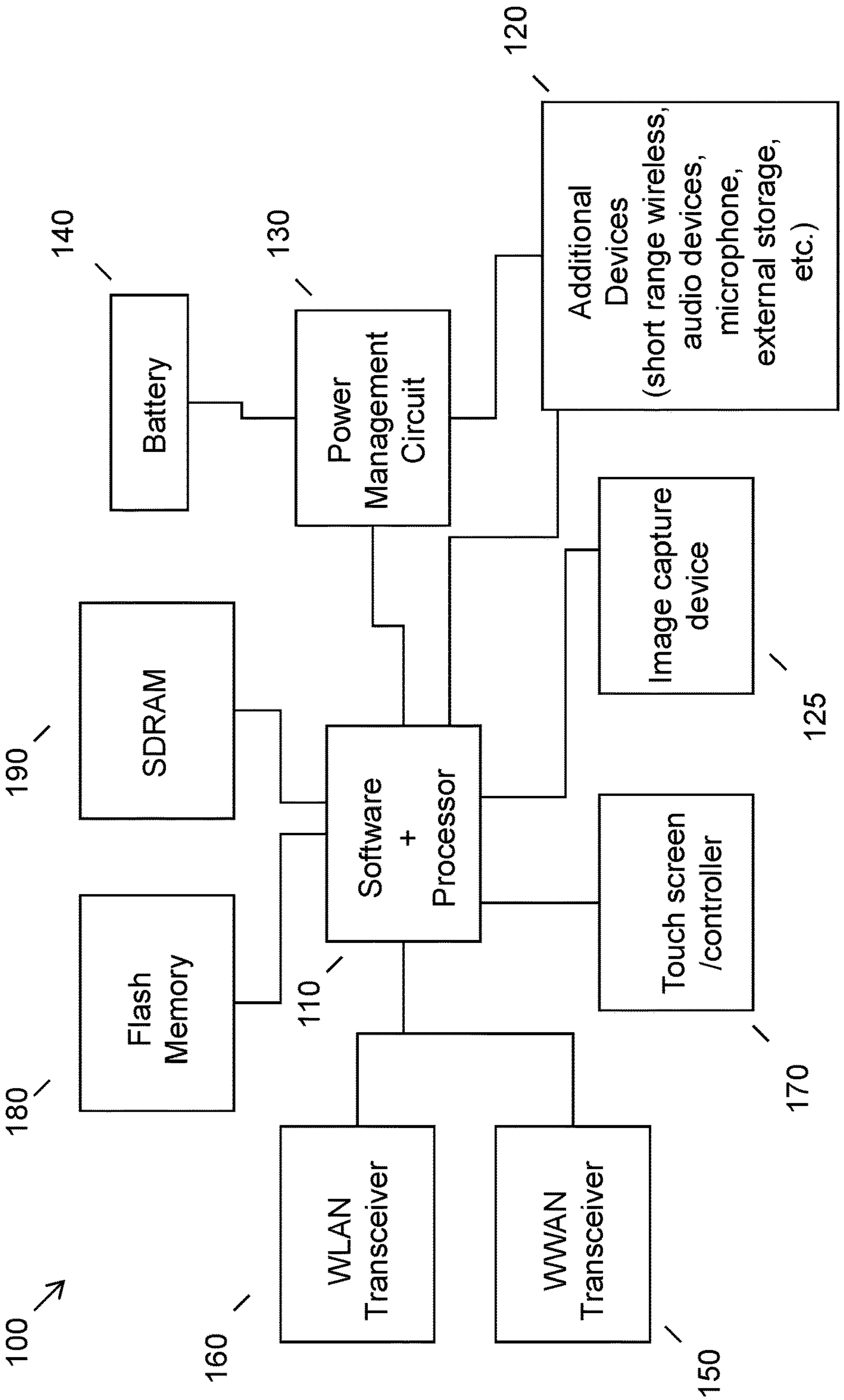
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While video conferencing and calling is becoming more commonplace, it does suffer from some issues. One such problem relates to lighting of the frames within a captured video stream or video feed. The image capture device generally includes an image signal processor (ISP) or other camera module that controls parameters of the image capture device to control features of frames and images captured by the image capture device. For example, the ISP may control exposure values (e.g., exposure time, gain, white balance, etc.), brightness, and/or the like, of the captured frame so as to make the scene within the frame more visible. Since certain portions of the frame may be of more interest than others, the ISP may identify a region of interest within a frame and adjust the image capture device parameters with respect to the region of interest. For example, a region of interest may be a face of an individual within a frame. The ISP or camera module may identify the face as the region of interest and then control the image capture device parameters so that the face is more visible within the frame, for example, by controlling the exposure, brightness, and/or the like, of the image capture device.

However, because the ISP or camera module that identifies the region of interest is not as powerful as other processors, the region of interest finding mechanism may have issues in correctly finding a region of interest or maintaining an identification of a region of interest. Additionally, the camera module is limited in the kinds of conditions that it can monitor and the types of image processing that it can do. Using the example of the face as a region of interest, the camera module may be able to find the face in one frame and thereafter adjust the image so that the face is visible, but may be unable to find the face in another subsequent frame, thereby adjusting the image so that the overall image is adjusted. This may result in the face being hard to see within the resulting video stream. Also, since the camera module may find the face in one frame and not in another and then again find the face, the resulting video stream may have a light frame, then a dark frame, and then a light frame, resulting in a flickering video stream which may be uncomfortable for some video conference participants to watch. The ability to find the region of interest is not only based upon the processing capabilities of the camera module, but may also be dependent on environment conditions, such as lighting within the physical space that is being captured by the camera module.

One technique for addressing this issue is to perform post-processing on the image. The post-processing can adjust characteristics of the image to make regions of interest more visible to a viewer. The post-processing is generally performed by a downstream processor, for example, a CPU, GPU, neural processing unit (NPU), and/or the like, at the operating system (OS) level. Performing the post-processing at this downstream processor provides many more resources and results in a better image. However, to perform this adjustment on a frame-by-frame basis as a video stream is being captured and transmitted requires significant power and processing resources, particularly since such post-processing would need to be performed in as close to real-time as possible for a live video stream.

Accordingly, the described system and method provides a technique for identifying a region of interest using a second processor and providing the identification of the region of interest to a first processor so that the image capture device can make adjustments to parameters of the image capture device for capture of subsequent frames based upon the region of interest. The system and method receive a frame comprising a scene. The frame is received from a first processor in communication with an image capture device of an image adjustment system at a second processor within the image adjustment system. This second processor, or processor other than the first processor in direct communication with the image capture device, may be a downstream processor that has the capabilities of analyzing frames or images and, particularly, identifying one or more regions of interest within an image or frame. The second processor may be a processor that has more powerful capabilities or algorithms for finding a region of interest as compared to the capabilities or algorithms of the first processor, for example, a camera module, ISP, and/or other image or frame processing components.

Once the second processor, also referred to as a downstream processor for ease of readability, has identified the region of interest within the frame, the downstream processor can provide this identification back to the first processor. The first processor, using the identification of the region of interest, may adjust one or more parameters of the image capture device for subsequent frames that are captured by the image capture device. The adjustment is performed in view of characteristics within the region of interest. In other words, the image capture device identifies characteristics within the region of interest and makes adjustment to the parameters of the image capture device to result in changes to the characteristics of the region of interest. For example, if the region of interest is a face of an individual and in the frame the face appears to have shadows or is too dark, the first processor adjusts parameters of the image capture device (e.g., brightness, exposure values, focus, ISO gain, etc.) to result in the face being lighter or easier to see within the frame. These parameter adjustments are used for subsequent frame capture before a frame is captured by the image capture device, as opposed to post-processing of frames already captured.

Therefore, a system provides a technical improvement over traditional methods for capturing multiple images, frames, and/or video streams. Instead of relying on the ISP or other camera module to identify the region of interest, the described system and method passes this identification off to a downstream processor. The downstream processor has more powerful processing capabilities and/or better region of interest identification algorithms which allows for not only more accurate identification of a region of interest, but is also better about maintaining a region of interest. This means the region of interest does not get lost and then found and then lost, thereby resulting in a more stable video stream and a video stream that appears more consistent. Thus, the described system improves the software techniques for image capture, image processing, and creation and transmission of video streams and video feeds, particularly live or substantially real-time video streams and video feeds, by providing for more accurate region of interest identification utilizing a more powerful processor or better region of interest finding algorithms, while still allowing for adjustments to be made on a frame-by-frame basis and before a frame is captured. Accordingly, resource and power intensive post-processing does not have to be performed on images or frames, but the algorithms and processing capabilities of these processor or drivers that generally perform the post-processing can be utilized to perform the region of interest identification. This results in more accurate region of interest identification than using the ISP or camera module and maintains the accuracy and capabilities of the region of interest identification that can be performed using downstream processors or drivers.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, audio devices, microphones, etc. System 100 also commonly includes image capture device 125 (e.g., camera, infrared camera, heat signature camera, etc.). System 100 often includes a touch screen 170 for data input and display/rendering. System 100 also typically includes various memory devices, for example flash memory 180 and synchronous dynamic random-access memory (SDRAM) 190.

Figure 2:
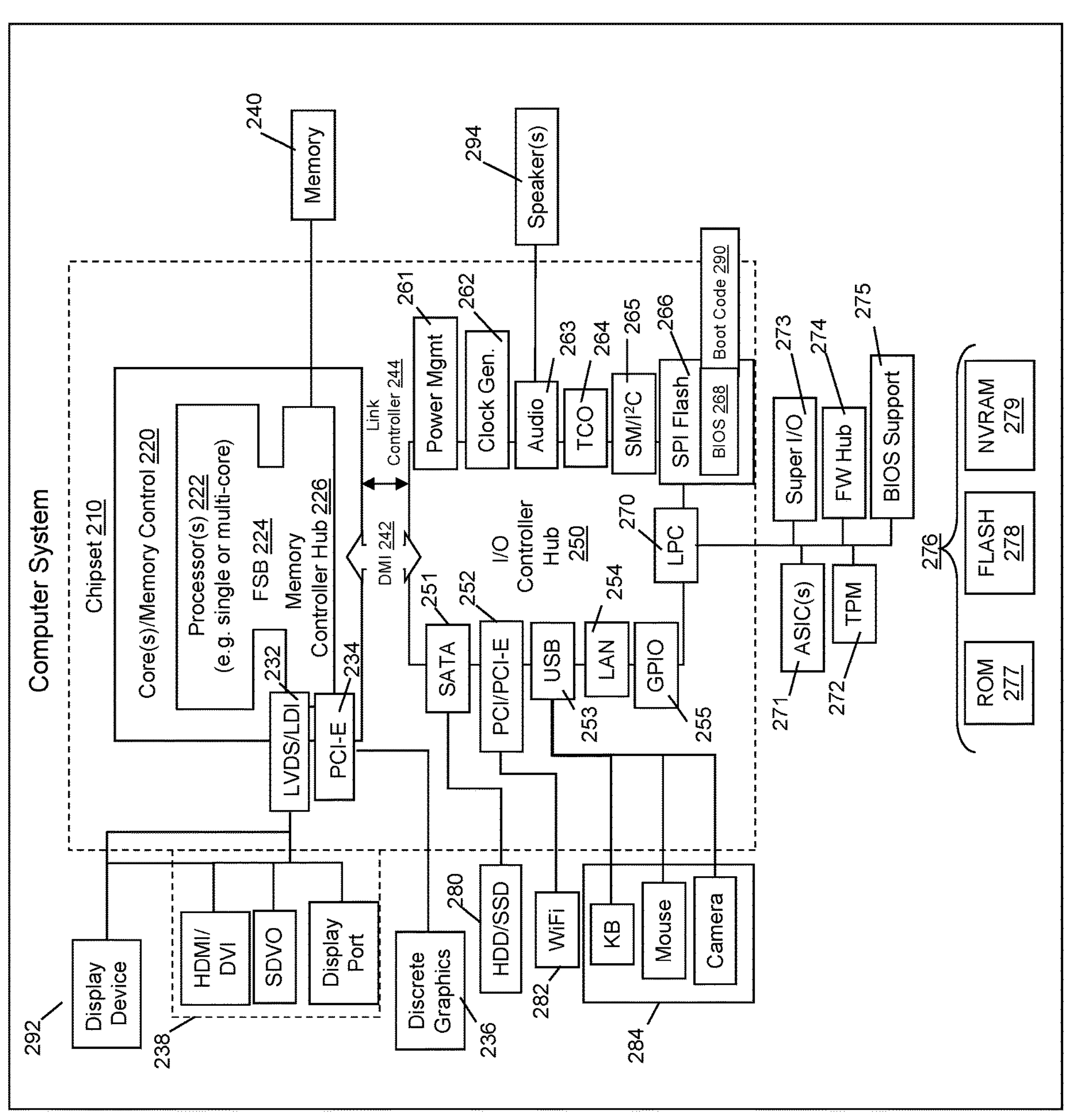
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support. It should be noted that some devices shown in FIG. 2 as being included as connected via a certain interface may be connected via a different interface or an internal interface. For example, a camera is illustrated as being connected via the USB 253 interface, but some devices may have internal cameras that are not connected via a USB 253 interface.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in devices or systems that capture images, analyze images, process images, and/or the like. For example, the circuitry outlined in FIG. 1 may be implemented in a tablet or smart phone embodiment, whereas the circuitry outlined in FIG. 2 may be implemented in a personal computer embodiment.

Figure 3:
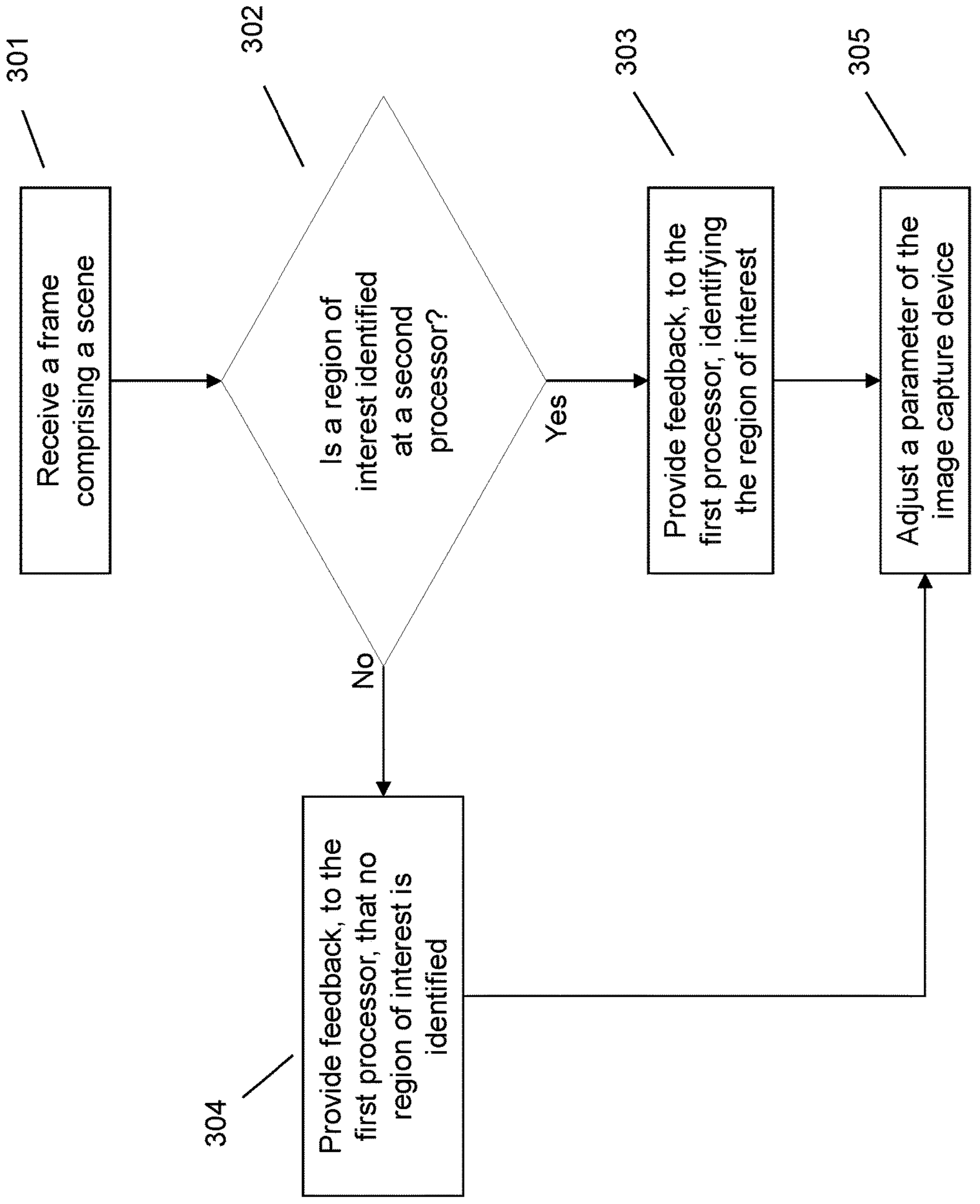
FIG. 3 illustrates an example method for identifying a region of interest using a second processor and providing the identification of the region of interest to a first processor so that the first processor can make adjustments to parameters of the image capture device for capture of subsequent frames based upon the region of interest.

FIG. 3 illustrates an example method for identifying a region of interest using a second processor and providing the identification of the region of interest to a first processor so that the first processor can make adjustments to parameters of the image capture device for capture of subsequent frames based upon the region of interest. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to identify a region of interest using a second processor and provide feedback to a first processor so that parameters of an image capture device can be adjusted for subsequent frames based upon the region of interest. Additionally, the image adjustment system includes modules and features that are unique to the described system.

The activation of the image adjustment system may be manual, where a user provides input indicating the image adjustment system should be activated, or automatic where the image adjustment system detects a trigger event indicating that the system should be activated. Example trigger events include activation of the device, activation of software or an application utilizing the image adjustment system (e.g., video conference application, video call application, image capture system, other application or software utilizing an image capture device, application utilizing or transmitting a video stream or feed, etc.), and/or the like. For example, the image adjustment system may be utilized with video conference or call software. In other words, when the video conference or call software is activated, the image adjustment system may also be activated. While the majority of this discussion will describe the image adjustment system being used in connection with a video conference system or software, this is a non-limiting example, as the image adjustment system may be utilized with any application or software which captures images, transmits images, and/or receives images.

Additionally, while the image adjustment system may be most beneficially used with images or frames which are captured as part of a video, the system may also be utilized with the capture of still images or frames. For example, the system may be utilized in a system where still images are being taken at a predetermined frequency of a static scene or a scene where the field of view does not change or has minimal changes. In other words, the described system can be utilized with still images where a downstream processor could identify a region of interest and the general location of the region of interest does not change or changes very little between the transmitted image or frame and a subsequent image or frame. It should be noted that, as described in more detail below, the location and size of the region of interest may be identified so as to account for movement of an object or objects within the region of interest or regions of interest. This same principal can be applied to a still image or series of still images that are not a part of a video.

The image adjustment system can be utilized during a live video stream or live video feed. In other words, as the image capture device is being used to capture video or still images that are occurring in real-time, the image adjustment system may be performing the described functions and this information may be incorporated into a video feed or stream that is being transmitted to other participants or another data storage location (e.g., cloud storage system, database, video storage system or application facilitated over the Internet, etc.) as the video or still images are being captured and transmitted. An example of this type of real-time streaming or video feed is the use of a video conferencing system where multiple participants are logged into a virtual meeting room. Each of the participants, or a subset thereof, may have an image capture device that is capturing images of the participant or an environment of the participant. The image capture device, and image adjustment system as described, makes adjustments and then transmits the video of the participant or environment of the participant to the other participants in the video conference in real-time or substantially real-time. This is referred to as a live video feed or live video stream. The transmission of the video to other participants occurs of a transmission medium, for example, a wireless connection, a wired connection, an Internet connection, and/or the like.

The image adjustment system may be a standalone system, may be accessible through other computing devices, and/or a combination thereof. For example, the image adjustment system may be a standalone system that can be accessed by a user and/or may be or provide an application that is accessible by a user on another computing device. The image adjustment system may be accessible using any type of computing device, for example, personal computer, laptop computer, smartphone, tablet, smartwatch, head-mounted display, smart television or other smart appliance, and/or the like.

The image adjustment system may have an associated graphical user interface. The graphical user interface may be provided on a display or monitor, which may or may not be associated with the image adjustment system. In other words, the image adjustment system may have a dedicated display or monitor or may be accessible using any display or monitor. In either case, the image adjustment system may provide instructions to generate and display the graphical user interface on the display device being used to access the image adjustment system. The graphical user interface may also be updated and managed based upon instructions provided by the image adjustment system. In other words, the image adjustment system generates and transmits instructions to create and update the graphical user interface.

The graphical user interface may include a plurality of tabs, windows, and/or unique interfaces. The graphical user interface may include graphical user interface icons or elements. Graphical user interface icons or elements may include static non-selectable elements (e.g., headers, footers, logos, global information areas, graphics, etc.), dynamic non-selectable elements (e.g., local information areas applying to a specific element, dynamic graphics, information areas that update based upon the information provided therein, indicators, statistics displays, etc.), static selectable elements (e.g., radio buttons, menu icons, selectable indicators, etc.), dynamic selectable elements (e.g., form field input areas, pull-down menus, pop-up windows, etc.), and/or any other elements that may be found in a graphical user interface.

The graphical user interface may allow a user to provide input identifying parameters to be used by the image adjustment system. For example, the image adjustment system may have different parameters for adjusting a frequency of region of interest identification, adjusting a precision of region of interest identification, identifying applications to utilize the image adjustment system, and/or the like. Input may be provided by the user using any type of input modality, including, but not limited to, mechanical input (e.g., keyboard input, mouse input, etc.), touch input, audible or voice input, gesture input, haptic input, and/or the like. The graphical user interface may also provide displays that identify the parameters of the image adjustment system. It should be noted that the parameters can be different for different applications, different computing systems, different users, and/or the like. Thus, the parameters of the image adjustment system are not always the same. However, the image adjustment system may have default or system-wide settings that are the same across different users, systems, applications, and/or the like, until the parameters are adjusted or otherwise changed.

It should be noted that different users may configure the graphical user interface per their preferences. Thus, the graphical user interface layout and configuration may be different between users. How much a user can configure the layout may be restricted or set by a system administrator and/or the like. Additionally, different users or different user roles may have different levels of access, which may also change how and what information is displayed. Thus, different graphical user interfaces may be displayed by the system.

The image adjustment system may utilize one or more artificial intelligence models in identifying a region of interest. For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model that is fine-tuned for the image adjustment system or may be a model that is created from scratch. Since the image adjustment system is used in conjunction with images and video, some models that may be utilized by the system are image analysis models, image generative models, image classification models, and/or the like. The model may be trained using one or more training datasets. Additionally, as the model is deployed, it may receive feedback to become more accurate over time. The feedback may be automatically ingested by the model as it is deployed. For example, as the model is used to identify regions of interest, if a user modifies the region of interest or otherwise provides some indication that the region of interest may be incorrect, the model ingests this feedback to refine the model. On the other hand, as the model identifies regions of interests, and no changes are made to the identified region of interest, the model may utilize this as feedback to further refine the model. Training the model may be performed in one of any number of ways including, but not limited to, supervised learning, unsupervised learning, semi-supervised learning, training/validation/testing learning, and/or the like. Additionally, the model or models may be used in conjunction with computer vision in order to understand, interpret, and manipulate visual data.

As previously mentioned, an ensemble of models or multiple models may also be utilized. Some example models that may be utilized are variational autoencoders, generative adversarial networks, recurrent neural network, convolutional neural network, deep neural network, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The capture of digital images generally requires the use of optics, a sensor, and processor. The processor, referred to as the first processor for ease of readability, is the first processor which processes a captured image. The first processor also usually controls the sensor. Depending on the product or device (e.g., smart phone, personal computer, laptop computer, smart watch, personal digital assistant, digital camera, etc.), the first processor may either be integrated into the chip that houses the sensor, or may be integrated into a different chip. This different chip may also include or contain the downstream processor. Thus, the first processor and the second processor may be contained on the same chip or may be on different chips.

Accordingly, within the image adjustment system are components that perform different functions. The image adjustment system includes an image capture device and associated components. The image capture device may be a camera or other device or component that can be utilized to capture images, for example, an infrared image capture device, web camera, heat signature image capture device, traditional digital camera, night vision image capture device, camera integrated into an information handling device (e.g., laptop computer, tablet, smart watch, smart phone, smart appliance, television, smart television, etc.), and/or the like. The image capture device, referred to as a camera for ease of readability, may include integrated or otherwise associated components. These associated components may be components that perform functions only for the camera. For example, the associated components may include a camera module, ISP, camera drivers, camera processors, and/or the like.

The image adjustment system may include additional components, including processors, memory, and/or the like, for example, as described in connection with FIG. 1 and FIG. 2. Relevant to the described system and method are those processing components that can be utilized to find a region of interest. These processing components will be referred to as a second processor or downstream processor or processing components to distinguish from the first processor of the image adjustment system. The downstream processing components may be any components, or software, that can be utilized to find a region of interest, for example, a GPU, CPU, NPU, processing driver, artificial intelligence model, and/or the like. These are referred to as downstream components because they are traditionally used to perform post-processing on images, meaning images that are already captured are transmitted to these components for processing. In other words, the downstream components are processors or components that traditionally receive an image that has already been processed by the first processor. Thus, in the flow of processing, these components traditionally perform processing functions on images after the first processor has performed any processing functions on the image. However, it should be noted that within the described system, the first processor may receive instructions from the second processor regarding how subsequent images that are captured should be processed or adjusted.

At 301, a first processor of the image adjustment system transmits a frame including a scene to a second processor, specifically a second processor different than the first processor. Conversely, the second processor receives a frame including a scene from the first processor. The image capture device captures a frame, which may be a still image, frame within a video, frame within a video feed, frame within a video stream, and/or the like, and transmits it to the downstream processor via the first processor. It should be noted that the downstream processor may also receive frames from other components and perform the described steps on those frames. While the discussion will focus on a single frame, it should be readily understood that the described system can be utilized for processing multiple frames. Additionally, the described system can be utilized to process frames from multiple image capture devices, from multiple components including an image capture device, from multiple first processors, from multiple video feeds, and/or the like, either simultaneously, sequentially, or a combination thereof.

The received frame includes a scene. In other words, the frame includes an image that has one or more objects within the image. The objects may be any object, including, but not limited to, individuals, parts of an individual, landscapes, buildings, vehicles, animals, visual aid, furniture, and/or the like, or a combination thereof. For ease of readability, the example that will be used throughout is one where the frame includes a scene having one or more individuals, and, more particularly, faces of the individuals. However, the frame may include a scene having many different objects and may not include an individual or a face of an individual at all. Regardless of what is within the scene, the system attempts to find a region of interest. A region of interest is an area, region, or portion within the frame or scene that is to be a region of focus or a region that should be visible or identifiable within the frame. In other words, a region of interest is a region, area, or portion within the frame that adjustments within the frame will be made in reference to, so that the region of interest is more easily seen as compared to the frame without the adjustments. A region of interest may be of any shape or size as compared to the entire frame. In a video conferencing application, the region of interest may be a face of an individual, a whiteboard, a presentation board, a presentation object, a visual aid, and/or the like. The scene may include multiple regions of interest, for example, multiple individuals, multiple visual aids, an individual and a visual aid, and/or the like.

Receipt of the frame may occur at a predetermined frequency. The predetermined frequency may be set by default, set by a user, set based upon an application, set based upon capabilities of the device the image adjustment system is running on, and/or the like. The predetermined frequency may be controllable through the graphical user interface. The predetermined frequency may be every single frame that is captured by the image capture device. On the other hand, the predetermined frequency may be every few frames or some other frequency that is not every single frame. The predetermined frequency may also be based upon a trigger event that indicates the region of interest should be identified. One example trigger event is movement of a user within the frame or scene. Another example trigger event is a change in the object of focus (e.g., focus changes from an individual to a visual aid, focus changes from a visual aid to an individual, focus changes from an individual to another individual, etc.). A final, non-limiting example of a trigger event, is a change in a condition of an environment of objects within the scene, for example, a change in lighting within the environment, a change in shadows within the environment, a change in brightness within the environment, and/or the like.

At 302, the image adjustment system determines whether a region of interest can be identified by the second processor. The region of interest is identified using the downstream component or second processor instead of the first processor. Since the downstream component typically has better processing capabilities and/or algorithms than the first processor, detection of the region of interest should be more accurate and consistent between frames than when using the first processor. Additionally, the second processor generally provides an ability to have multiple algorithms, thereby allowing for the use of different region of interest finding algorithms for finding one or more regions of interest within a frame.

To find the region of interest, the second processor may utilize one or more region of interest finding algorithms. One algorithm includes a face detection algorithm. Since a region of interest may not always be a face, different algorithms may also be used. For example, entity or object detection algorithms may be utilized, image recognition algorithms may be utilized, image classification algorithms, and/or the like. Additionally, or alternatively, artificial intelligence models, as previously described, may be utilized to find the region of interest. The algorithm or model that is utilized to find the region of interest may be one that is defined or tuned to find a particular type of object. For example, if the region of interest contains faces or individuals, the system may utilize a face recognition algorithm or artificial intelligence model that is trained for face recognition. As another example, if the region of interest contains visual aids (e.g., whiteboards, televisions, projector screens, etc.), the system may utilize an object recognition algorithm or artificial intelligence model that is trained for object or entity recognition.

To determine what type of object, and therefore, what algorithm or model should be utilized, the system may use characteristics or secondary sources or information that may provide an indication of the type of object that should be within a region of interest. For example, the system may utilize features or characteristics of an environment to identify what type of object will be found within a region of interest. This may include utilizing an algorithm or model to first classify an image so that a context or features or characteristics within the image can be identified. Features or characteristics or a context of the environment that may assist in determining what portion of the image should be identified as a region of interest includes objects within the frame, foreground and background elements within a frame, stationary and dynamic objects within a frame, objects identified by a user as being within a region of interest, and/or the like.

Since a downstream processor is utilized, the downstream processor may have access to more information than the first processor. For example, the second processor may be able to access secondary sources or information to perform more accurate region of interest identification. Secondary sources or information that may be utilized in assisting in identifying a region of interest may be secondary sources or information that may define a context of a frame or a use of an image capture device. Example secondary sources or information include a user utilizing the image adjustment system, an application that the image capture device is being used within, an object of focus of participants within a frame, a schedule of users and context information related to the schedule, meeting agendas, audio provided at the same time a frame is captured, and/or the like. To capture the context information, the system may utilize algorithms and or artificial intelligence models. For example, the system may utilize optical character recognition (OCR) algorithms to identify words within a schedule or agenda and entity extraction and parts of speech analysis techniques to identify entities within the schedule or agenda. The system may also use syntactic analysis to identify a context of the entities within the schedule or agenda. Corresponding techniques may be used to extract information from other secondary sources or information (e.g., image extraction techniques for images, audio parsing techniques for audio information, etc.). For example, if a user says "on the whiteboard", the image adjustment system can parse this audio to identify the user is talking about the whiteboard and thereafter identify that the whiteboard is a current region of interest, which may be in addition to a face of an individual or instead of a face of an individual visible within the frame.

Once the region of interest is identified, the downstream component, or second processor, may perform actions to define the region of interest so that this information can be conveyed to the image capture device. It is also noted that multiple regions of interest may be identified. One technique for defining the region of interest is cropping to the region of interest and this crop location is then conveyed to the image capture device. Since objects within a frame can move from one frame to another, the system may utilize estimation techniques to define the region of interest as larger than the region of interest found within a single frame. The estimation techniques may be used to account for motion that may occur from one frame to another. The estimation techniques may also allow for the region of interest identification to occur every few frames instead of every frame. One estimation technique is a motion estimation technique of the region of interest that estimates where or how an object may move between frames. The motion estimation may be assisted through the use of a motion estimation algorithm, historical movement information, an artificial intelligence model, and/or the like.

The system may also define a region of interest as larger than the actual object within the region of interest. With the region of interest being larger than the actual object, motion between frames will likely still occur within the region of interest. Additionally, if there is any error in the region (e.g., the system identifies the size of an object of interest as being different than the actual object, the system identifies the exact location of the object as being different than the actual location of the object, etc.) this error will be accounted for utilizing the enlarged defined region of interest. The region of interest may be of any size or shape.

In defining the region of interest, the system may also define a mask that encompasses the object of interest. The mask provides the flexibility of identifying a region of interest that may have an irregular shape. However, use of a mask is not strictly required to identify regions of interest with irregular shapes. Additionally, a mask may have any shape, not only irregular shapes, including a circle, rectangle, square, and/or the like. For example, if a region of interest is a face of a user, the system would identify the face of the user, apply a mask covering the face of the user, and ignore or black out everything else within the frame or scene. The mask also supports multiple regions by applying the mask to all the regions of interest and ignoring the other regions within the frame or scene.

Additionally, in defining a mask, the mask can be weighted and multiple masks may be weighted differently within the frame. The weights of the mask may then be used by the first processor within the parameter adjustment. For example, a portion of the frame having a mask with a higher weight will be prioritized over a portion of the frame having a mask within a lower weight. Thus, weighted masks allow for a prioritization of different parts of the frame when adjusting the parameter values of the image captured device. For example, if a face within the frame has a weight of 1.0 and a whiteboard within the frame has a weight of 0.7, when making adjustments to the parameter, the image capture device will prioritize the values associated with the face over the values associated with the whiteboard. Thus, weighted masking allows for different regions to be weighted differently. Any of these weightings can be used by the first processor to adjust the image capture device parameters as described in connection with 305.

If, at 302, the second processor cannot identify a region of interest using the downstream component, the image adjustment system may provide feedback to the first processor that no region of interest has been identified by the second processor at 304. In this case, the first processor may make no adjustments to parameters of the image capture device or may make adjustments, as discussed in connection with 305, to the parameters of the image capture device that adjust the entire frame. Additionally, or alternatively, the image adjustment system may set the region of interest as the entire frame responsive to not finding a region of interest or not finding a focused region of interest within the frame. The first processor may also attempt to identify a region of interest and make adjustments to parameters of the image capture device as discussed in connection with 305.

If, on the other hand, the image adjustment system can identify a region of interest using the downstream processor at 302, the image adjustment system provides feedback, to the first processor, identifying the region of interest at 303. In other words, the downstream component provides instructions to the first processor delineating the region of interest within the frame. In the event that no focused region of interest was identified, the region of interest may be the entire frame. However, if a focused region of interest was identified, or multiple regions of interest were identified, the image adjustment system provides a designation of the region of interest. The designation is provided in a manner that is understandable by the first processor. This may include identification of the mask and associated location, identification of the crop location and size of the cropped area, provision of the frame with the region of interest marked, and/or any other instructions that properly identify the location of the region of interest to the first processor. This may also include, in the case of a weighted mask, the location and weightings of the different portions of the weighted mask.

At 305, the image adjustment system uses the region of interest and characteristics of the region of interest to adjust a parameter of the image capture device for subsequent frames captured by the image capture device. Thus, instead of a post-processing step where already captured frames are adjusted, the described system is utilized to adjust frames to be captured. To make the adjustment, the image adjustment system may identify characteristics within the received image at the region of interest. It should be noted that the downstream component can also identify the characteristics, and in this case, would provide an indication of those characteristics to the first processor. Additionally, or alternatively, the downstream processor may identify some characteristics and the first processor may identify other characteristics or verify the characteristics identified by the downstream component. In the case that a plurality of regions of interest are identified, characteristics may be identified for each or all of the regions of interest. Characteristics may also be identified for different portions of a weighted mask.

Characteristics within the received image at the region of interest that may be identified may include characteristics within the frame that result in the region of interest being hard to see or difficult to distinguish from other areas within the frame. For example, different lighting conditions may result in objects within a region of interest being too dark or too light as compared to other objects within the environment and, therefore, difficult to distinguish from the other objects within the environment. As another example, if the region of interest is a face of an individual, different lighting within an image may make it difficult to see facial features of the individual. Thus, the identified characteristics are those that effect a visibility of the region of interest as compared to other objects within the frame. Example characteristics include lighting, focus, haze, sharpness, color, and/or the like.

The first processor performs the tuning of the parameters of the image capture device using algorithms of the first processor. However, the tuning of the parameters is performed in view of the region of interest identified using the image adjustment system. While not exhaustive, parameters of the image capture device that may be adjusted by the first processor are those parameters which change the visualization of the region of interest within the frame. For example, parameters that may be adjusted are those parameters that modify an appearance of lighting within a captured frame, and particularly, at the region of interest. Such parameters may include exposure values, brightness values, contrast values, and/or the like. Other parameters that may be adjusted include clarity, ISO sensitivity or gain, shadow or highlight values, and/or the like. In other words, the parameters that may be adjusted are parameters of the image capture device that can control the visibility of the region of interest. Additionally, since the parameters are adjusted in view of the region of interest and characteristics thereof, the parameters may only be adjusted for the region of interest and the same parameters may remain unchanged for the rest of the scene. Alternatively, the parameter values may be applied to the entire scene, which may result in other parts of the scene becoming unviewable or difficult to distinguish, but where the region of interest remains visible.

Once the parameters have been adjusted, these parameter values are utilized for subsequent frames that are captured by the image capture device. These parameters values remain until new information regarding a region of interest is received from the downstream component. In other words, instead of relying on a region of interest identification by the first processor to adjust the parameters, the image capture device will wait on a region of interest identification by the downstream processor before the parameters will be adjusted again. This region of interest identification by the downstream processor may occur at the predetermined frequency as previously discussed.

Once the region of interest is conveyed to the first processor and the parameters of the image capture device are adjusted for subsequent frame capture, the system may transmit the subsequent frames with the adjusted parameters to a display device. For example, in the case that the image capture device and image adjustment system is being used within a video conferencing system, the subsequent frames may be transmitted to other participants within the video conference. As previously noted, this transmission may occur in substantially real-time or within a live video stream. Additionally, in many video conferencing systems or video call systems, the video feed of the user is generally presented on a display screen along with video feeds or video streams of other participants. Thus, displaying the video feed or video stream may also include displaying the video feed or video stream on a display device of the user.

As an overall non-limiting example, the described system may be part of a video conferencing system. As an image capture device of the user captures video of the user and transmits the video to other participants within the video conference, the system removes the region of interest identification from the first processor, for example, the image signal processor of the camera system. Instead, the video feed is fed to a downstream processor. This processor may be the central processing unit (CPU), graphics processing unit (GPU), neural processing unit (NPU), a separate accelerator that is not the camera system image signal processor (ISP), and/or the like. Due to the increased processing power of the downstream processor, this second processor likely has bigger, better, and/or more robust region finding algorithms or capabilities. Additionally, the second processor has the ability to utilize multiple algorithms, has an increased flexibility to perform the region identification with driver or application software, has the ability to access secondary sources for more accurate region of interest identification, and/or the like, thereby making the region of interest identification more accurate and better as compared with only using the first processor to perform this dentification. With these capabilities, the downstream processor can find the region of interest, in this example, a face of a user, and mark that region as the region of interest.

The region of interest marking is relayed back to the first processor as the region of interest and a location of the region of interest within the video feed or frame. The first processor uses this region of interest information to adjust characteristics of the image capture device so that the region of interest is viewable within any subsequent frames that are captured by the image capture device. For example, the image capture device may change the exposure time, image brightness, and/or the like, with relation to the region of interest so that the region of interest is visible in the subsequent frames and, therefore, the video feed that is presented to other participants of the video conference.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:

receiving, from a first processor in communication with an image capture device of an image adjustment system and at a second processor, a frame comprising a scene;

identifying, using the second processor and one or more region of interest finding algorithms, a region of interest within the frame, wherein the region of interest comprises an object within the scene, wherein identifying the object within the scene comprises utilizing the one or more region of interest finding algorithms and at least one of: a characteristic, a secondary source, and additional information indicating a type of the object required to be within the scene;

providing, from the second processor to the first processor, feedback identifying the region of interest, wherein the feedback identifying the region of interest comprises at least one of: the object within the scene and the type of the object required to be within the scene; and adjusting, using the first processor and in view of characteristics of the region of interest, a parameter of the image capture device for subsequent frames captured by the image capture device.

2. The method of claim 1, wherein the frame comprises a frame within a video stream being captured by the image capture device.

3. The method of claim 2, wherein the receiving the frame comprises receiving a frame within the video stream at a predetermined frequency.

4. The method of claim 2, wherein the adjusting is performed in substantially real-time as the video stream is being captured.

5. The method of claim 1, comprising providing, to a display device, a video stream comprising frames captured by the image capture device subsequent to the adjusting.

6. The method of claim 1, wherein the identifying a region of interest comprises identifying a plurality of regions of interest and wherein the adjusting is performed in view of characteristics of the plurality of regions of interest.

7. The method of claim 1, wherein the identifying a region of interest comprises setting the region of interest as the entire frame responsive to determining a focused region of interest is not found within the frame.

8. The method of claim 1, wherein the adjusting a parameter comprises adjusting a parameter of the image capture device that modifies an appearance of lighting within a captured frame.

9. The method of claim 1, wherein the second processor is not an image signal processor.

10. A system, the system comprising:

an image capture device;

a first processor in communication with the image capture device;

a second processor in communication with the first processor;

a memory device that stores instructions that, when executed by the processor, causes the system to:

receive, from the first processor of an image adjustment system and at the second processor, a frame comprising a scene;

identify, using the second processor and one or more region of interest finding algorithms, a region of interest within the frame, wherein the region of interest comprises an object within the scene, wherein identifying the object within the scene comprises utilizing the one or more region of interest finding algorithms and at least one of: a characteristic, a secondary source, and additional information indicating a type of the object required to be within the scene provide, from the second processor to the first processor, feedback identifying the region of interest, wherein the feedback identifying the region of interest comprises at least one of: the object within the scene and the type of the object required to be within the scene; and adjust, using the first processor and in view of characteristics of the region of interest, a parameter of the image capture device for subsequent frames captured by the image capture device.

11. The system of claim 10, wherein the frame comprises a frame within a video stream being captured by the image capture device.

12. The system of claim 11, wherein the receiving the frame comprises receiving a frame within the video stream at a predetermined frequency.

13. The system of claim 11, wherein the adjusting is performed in substantially real-time as the video stream is being captured.

14. The system of claim 10, comprising providing, to a display device, a video stream comprising frames captured by the image capture device subsequent to the adjusting.

15. The system of claim 10, wherein the identifying a region of interest comprises identifying a plurality of regions of interest and wherein the adjusting is performed in view of characteristics of the plurality of regions of interest.

16. The system of claim 10, wherein the identifying a region of interest comprises setting the region of interest as the entire frame responsive to determining a focused region of interest is not found within the frame.

17. The system of claim 10, wherein the adjusting a parameter comprises adjusting a parameter of the image capture device that modifies an appearance of lighting within a captured frame.

18. A product, the product comprising:

a computer-readable storage device that stores executable code that, when executed by a processor, causes the product to:

receive, from a first processor in communication with an image capture device of an image adjustment system and at a second processor, a frame comprising a scene;

identify, using the second processor and one or more region of interest finding algorithms, a region of interest within the frame, wherein the region of interest comprises an object within the scene, wherein identifying the object within the scene comprises utilizing the one or more region of interest finding algorithms and at least one of: a characteristic, a secondary source, and additional information indicating a type of the object required to be within the scene;

provide, from the second processor to the first processor, feedback identifying the region of interest, wherein the feedback identifying the region of interest comprises at least one of: the object within the scene and the type of the object required to be within the scene; and adjust, using the first processor and in view of characteristics of the region of interest, a parameter of the image capture device for subsequent frames captured by the image capture device.

* * * * *